United States Patent [19]

Vignone, Sr.

[11] Patent Number: 5,606,732

[45] Date of Patent: Feb. 25, 1997

[54] DIRECT CONNECT RADIO AND ANTENNA ASSEMBLY

[75] Inventor: Edward J. Vignone, Sr., San Clemente, Calif.

[73] Assignee: Rockwell International Corporation, Seal Beach, Calif.

[21] Appl. No.: 233,289

[22] Filed: Apr. 26, 1994

[51] Int. Cl.$^6$ ................................................. H04B 1/08
[52] U.S. Cl. ..................... 455/269; 455/348; 455/351; 343/702; 361/737; 361/686; 439/357; 439/916
[58] Field of Search ............................ 455/89, 90, 344, 455/347, 348, 349, 351, 269, 280; 361/737, 686; 342/357; 343/700 MS, 702; 439/916, 928, 680, 350, 357

[56] References Cited

U.S. PATENT DOCUMENTS

| | | | |
|---|---|---|---|
| 4,980,694 | 12/1990 | Hines | 455/89 |
| 5,007,863 | 4/1991 | Xuan | 439/928 |
| 5,198,824 | 3/1993 | Poradish | 343/700 MS |
| 5,335,276 | 8/1994 | Thompson et al. | 455/186.1 |
| 5,361,061 | 11/1994 | Mays et al. | 343/702 |
| 5,373,149 | 12/1994 | Rasmussen | 361/686 |
| 5,391,094 | 2/1995 | Kakinoki et al. | 361/686 |
| 5,470,233 | 11/1995 | Fruchterman et al. | 434/112 |

FOREIGN PATENT DOCUMENTS

| | | | |
|---|---|---|---|
| 0178511 | 10/1984 | Japan | 439/928 |
| 2246402 | 10/1990 | Japan | 343/702 |

OTHER PUBLICATIONS

*Mobile Office,* "How to Upgrade Your Cellular Phone in Two Easy Steps", Jan. 1993.
Socket, Global Positioning System Antenna Cable, 1993.
Micro Pulse, L1 GPS Lightweight Survey Antenna, Jul. 1993.
Micro Pulse, L1 GPS Airborne Antenna, Miniarinc, Aug. 1993.

*Primary Examiner*—Reinhard J. Eisenzopf
*Assistant Examiner*—Doris To
*Attorney, Agent, or Firm*—George A. Montanye; David J. Arthur; Susie H. Oh

[57] ABSTRACT

A direct connect antenna includes a passive patch-type antenna mounted to a radio, wherein the need for and use of a coaxial cable extension arrangement is eliminated. Thus, the characteristic impedances of the load and source can be better matched, resulting in lower reflection and distributed losses. The antenna is formed with guide slots for alignment and simple snap-on connection of the antenna to the radio to prevent coaxial connector mismatch and damage. The radio may be directly affixed and electrically coupled to a PCM-CIA compliant interface card which is insertable into a host computer. Accordingly, radio signals received by the direct connect antenna and radio arrangement are processed through the PC card and the computer.

17 Claims, 3 Drawing Sheets

DIRECT CONNECT RADIO AND ANTENNA ASSEMBLY

BACKGROUND OF THE INVENTION

1. Field of the Invention

The present invention relates to radio and antenna structures and connectors, and methods of implementing them. In particular embodiments, the present invention is directed to such structures, connectors, and methods for improving signal reception and transmission by a computer-based device which utilizes the global positioning system (GPS).

2. Description of Related Art

Today's compact and portable computers provide users with readily available computing capabilities at a moment's notice. However, this ready mobility of portable computers brings with it the uncertainty of location. There may be instances when a mobile user's location must be quickly determined. Tracking a user's location may be important, for example, to avoid potential danger in unfamiliar areas, for automatic vehicle location, and for marine, aviation and industrial applications, among others. Accordingly, the space-based navigation techniques of the GPS have been found to be important for assisting computer-users in determining their particular locations and directing them toward their desired destinations.

The GPS is a space-based radio navigation system that provides worldwide, all-weather determinations of position, altitude, time and velocity. The GPS is implemented using a passive radio receiver and is available to a virtually unlimited number of users. The GPS radio receiver detects and receives precise reference signals from a constellation of 24 GPS satellites orbiting the earth. Low cost GPS receivers have been available for several years in specific GPS-dedicated products. Typically, these GPS application-specific products have included such basic computer components of a display, Keyboard, power supply, processor and housing. Accordingly, it has been recognized that portable computers and the like are an excellent platform to utilize GPS technology.

Several methods have been devised to install and incorporate the hardware and software supporting GPS technology into portable computers. One method uses a Personal Computer Memory Card International Association (PCMCIA) format provided by a PCMCIA slot-equipped host computer. By taking advantage of the easily installable and removable features of PC cards within PCMCIA slots, GPS capabilities may be activated and used by almost anyone having access to a laptop-type computer or personal digital assistant (PDA). The packaging of a GPS receiver in the PCMCIA format, however, necessitates a format compliant with the PCMCIA standard. Accordingly, a streamlined GPS receiver RF front-end construction is desirable to contain the GPS product within the PCMCIA port.

Antenna placement, however, has been found to raise certain issues with regard to the particular positioning configuration of the antenna to maximize visibility of the antenna to the GPS satellites, yet minimize cumbersome external components and cables. Although such considerations are evident in a variety of wireless communications applications, an effective antenna placement and mounting structure has yet to be developed which provides for both simple and easy mounting and removal, while concurrently maximizing signal reception and quality.

Furthermore, the maximization of the signal reception level and the minimization of external noise and interference has been found to be a design challenge. To interconnect multiple electrical and electronic devices, such as an antenna to a radio, cables or other wiring schemes are typically implemented between the devices. For example, the coupling of an antenna to a radio to radiate or receive radio waves generally requires the use of a coaxial cable with RF connectors. Associated coaxial connectors may be necessary to connect the radio and antenna to the coaxial cable.

Coaxial cables, however, tend to introduce undesirable signal degradation attributable to signal attenuation through the cable, added receiver system noise, as well as reflection losses attributable to mismatched impedances. Reflection losses are apparent transmission losses across the cable which result when the impedance of a load, e.g., an antenna, is mismatched with that of a generator, such as a radio transmitter. Consequently, transmission losses on the line result when a portion of the energy is reflected due to the discontinuity of the mismatched impedances in the transmission line.

More particularly, referring to the GPS environment, a conventional cable configuration may include a GPS radio receiver 100 coupled to a PCMCIA interface 102 via a cable arrangement, as illustrated in FIG. 1. The PCMCIA interface 102 is coupled to the GPS receiver 100 by a serial interface port cable 104. A patch-type antenna 106 is coupled to the receiver 100 via a coaxial cable and connector arrangement 108. According to device specifications, this coaxial cable arrangement 108 may introduce reflection and transmission losses of approximately 2.5 dB to 5 dB maximum at 1575 megahertz (MHz). However, since GPS satellite signals are transmitted within a dynamic range between 50 dB down to approximately 30 dB, the inherent 5 dB cable loss would significantly degrade the signal level at the 1575 MHz GPS receiver frequency. Furthermore, if physical obstructions such as foliage or buildings are present, the signal strength could be even further weakened.

These losses can be significant, seriously affecting the intensity or amplitude of the received signals, and thus the ultimate acquisition of the desired signals. Moreover, if poor impedance matching or other factors cause the carrier-to-noise ratio to be particularly low, the radio receiver may not be sufficiently sensitive to pick up any radio signals falling within the desired dynamic range. As a consequence, extensive signal amplification and other electronic hardware may be necessary to increase the carrier-to-noise ratio. Signal amplification, however, may be difficult to incorporate in certain applications due to the limited availability of space to accommodate the necessary electronic hardware.

In addition, the mere physical presence of the coaxial cable, as well as the serial interface cable coupling the GPS receiver to the PC card, may present difficulties in certain applications, particularly if a lengthy amount of cabling is required. Loose cables may get caught on objects or other obstacles, leading to potential disconnection, or perhaps interfering with other equipment. Thus, not only do cables introduce signal attenuation and losses, but loose cables also create possibly hazardous physical obstructions and potential breakage of the communication line.

Furthermore, in addition to the signal degradation caused by the separate components (e.g., the PCMCIA interface card, intermediate serial port connector cabling, receiver, coaxial cable and connector assemblies, and antenna), these components also require individual maintenance in proper operating condition. Consequently, in addition to the increased potential for breakage or loss of one or more of the associated elements, the cost of maintenance and repair or replacement of the individual components could become quite expensive and impracticable.

SUMMARY OF THE INVENTION

Accordingly, it is an object of the present invention to provide a radio and antenna connection system, obviating, for practical purposes, the above-mentioned limitations, particularly in a manner requiring a relatively uncomplicated arrangement, while reducing system complexity and cost.

These and other objects are accomplished, according to an embodiment of the present invention, by a radio and antenna apparatus, and system for improving radio signal reception and transmission. A radio is directly coupled to a computer via a plug-in connection or receiving slot such as a PCMCIA interface slot. An antenna is mounted on the top surface of the radio via a coaxial connector having a first part and a second part. The antenna has a substantially flat bottom surface to which is coupled the first part of the coaxial connector. The second part of the coaxial connector is affixed to the top surface of the radio. Accordingly, when the first and second parts of the coaxial connector are affixed to the corresponding surfaces of the antenna and the radio, the top surface of the radio directly faces and is adjacent to the bottom surface of the antenna.

Preferably, the antenna comprises a patch-type antenna element having a size and shape that conforms to and is compatible with the size and shape of the radio. The patch antenna may be rigid or malleable, depending upon the particular radio operating conditions. In particular embodiments, the second part of the coaxial connector, which is coupled to the top surface of the radio, is contained in an indent in the surface of the radio, and the first part of the coaxial connector coupled to the bottom surface of the patch antenna mates directly to the second part of the coaxial connector. Accordingly, the need for external and internal coaxial cables is eliminated, while signal degradation and losses inherently produced when using such cables can be significantly reduced.

BRIEF DESCRIPTION OF THE DRAWINGS

The detailed description will be made with reference to the accompanying drawings, wherein like numerals designate corresponding parts in the several figures.

DETAILED DESCRIPTION OF THE PREFERRED EMBODIMENTS

The following detailed description is not to be taken in a limiting sense, but is made merely for the purpose of illustrating the general principles of embodiments of the invention. The scope of the invention is best defined by the appended claims.

Figure 1:
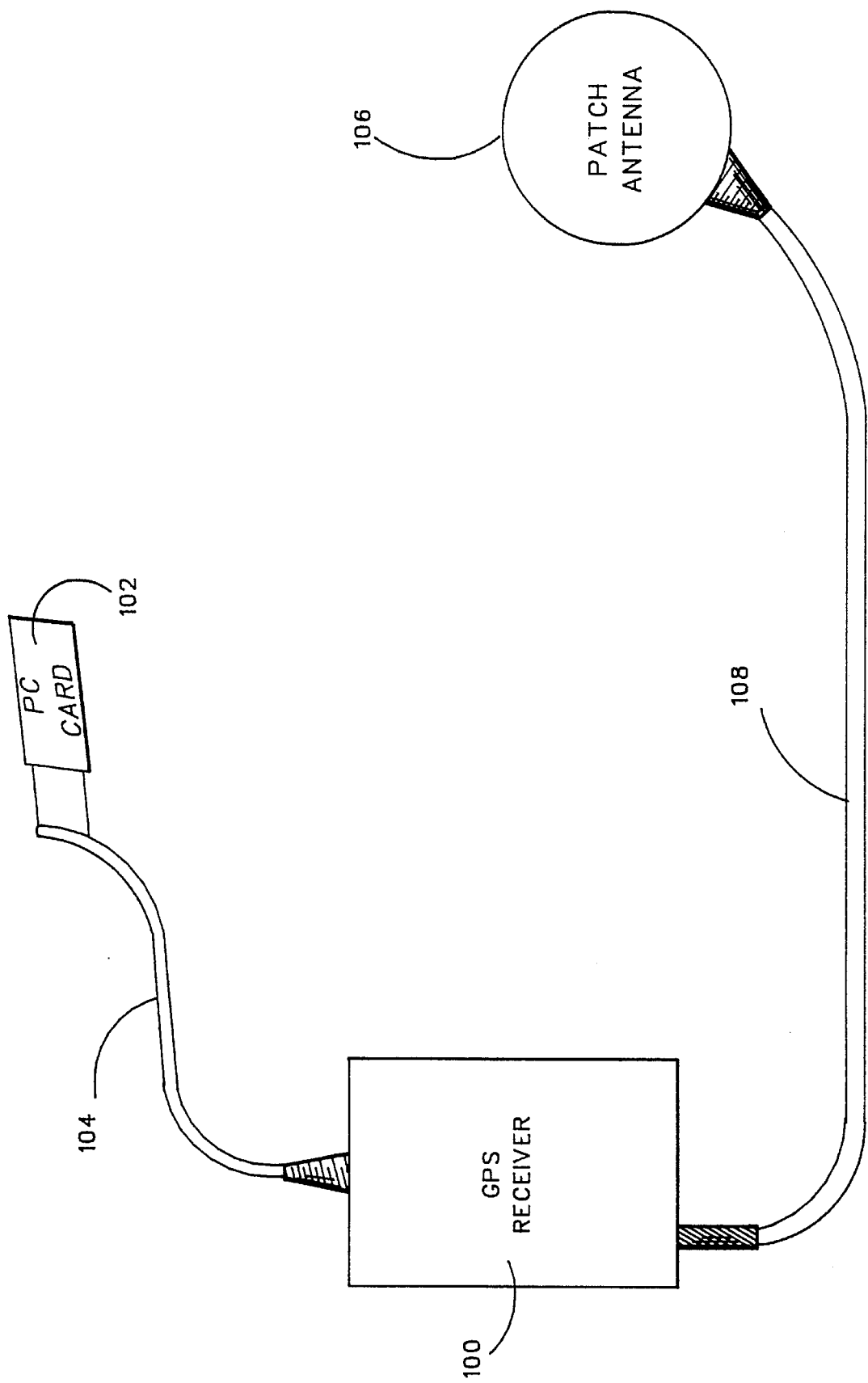
FIG. 1 is a perspective view of a prior art antenna arrangement.
Figure 2:
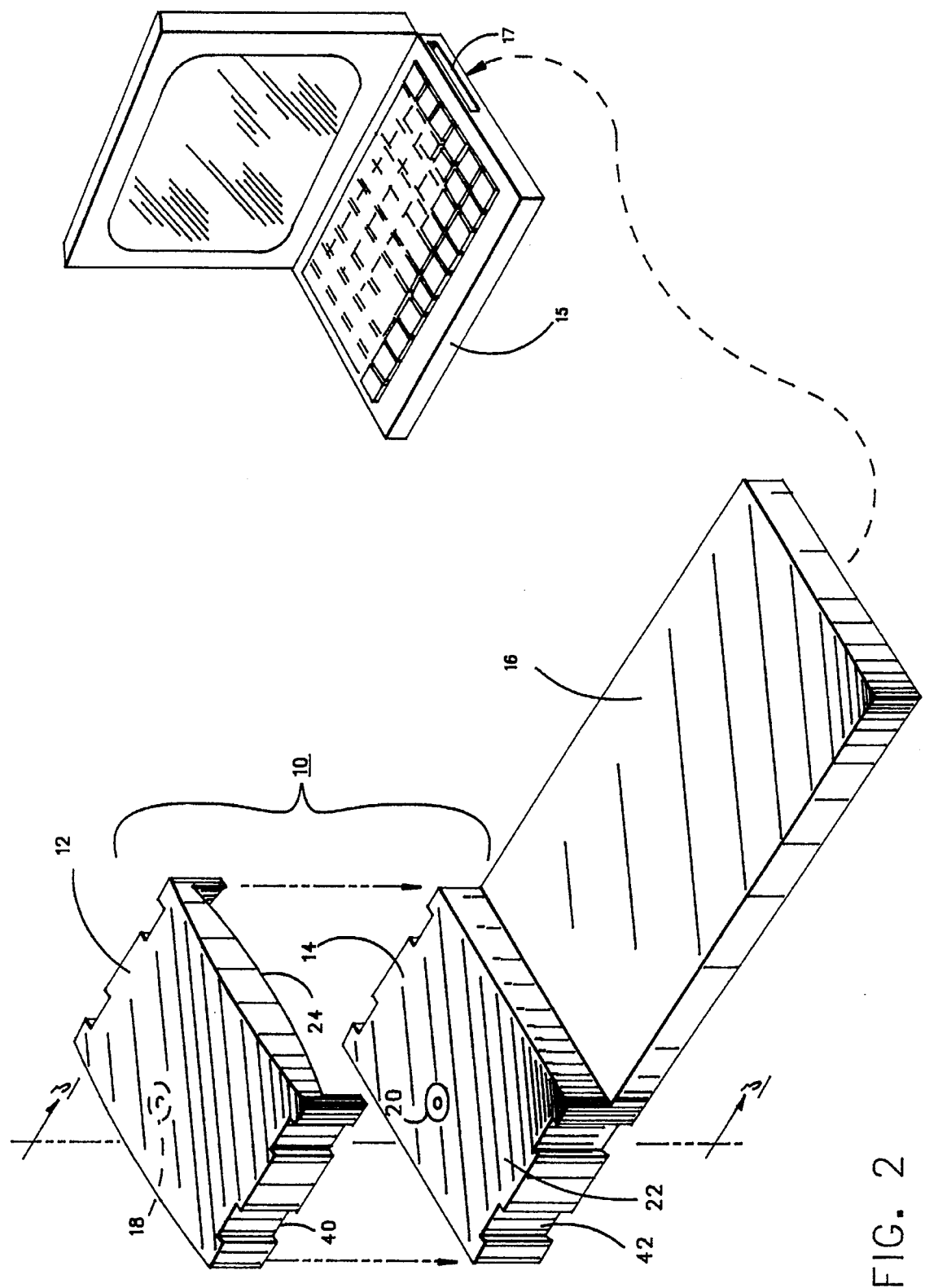
FIG. 2 is a perspective view of a direct connect antenna according to a preferred embodiment of the present invention.

A direct connect radio and antenna structure in accordance with an embodiment of the present invention is indicated generally at 10 in FIG. 2. The radio and antenna configuration includes a radio coupled to a plug-in computer-adaptable module or card 16, such as a PCMCIA interface card, and a directly connectable antenna 12. In the preferred embodiment, the radio component 14 comprises a GPS radio receiver. The receiver 14 may be directly coupled to a patch-type antenna 12. As discussed in more detail below, embodiments of the present invention provide GPS receiver capabilities embedded within a PCMCIA format.

It will recognized that other means to decouple the radio receiver and antenna assembly from a microprocessor controller are available and may be implemented. In the preferred embodiment described herein, however, the radio and antenna are directly coupled to the host computer via the PCMCIA interface card implementation.

Antenna embodiments of the present invention provide for substantially reduced RF signal degradation typically attributable to distributed cable losses and attenuation introduced by conventional antenna cable arrangements. For example, coaxial cables are typical sources of cable losses. Accordingly, embodiments of the present invention are directed to decreasing the amount and effects of coaxial cable reflection losses and distributed losses by eliminating unnecessary cabling. Consequently, the need to match the characteristic impedances of the interconnected components is likewise eliminated.

Figure 3:
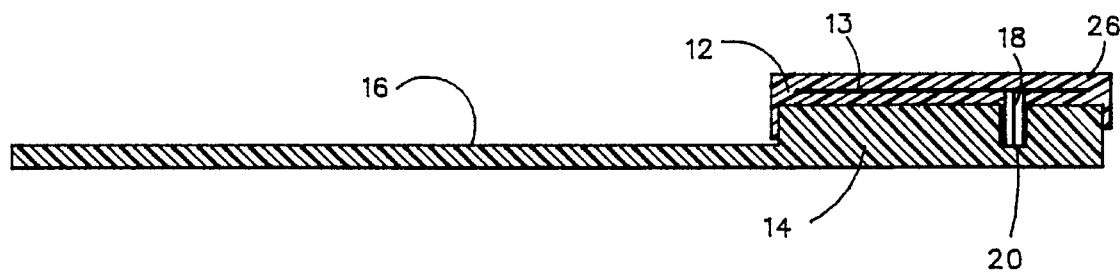
FIG. 3 is a side cross-sectional view of a mounted direct connect antenna along lines 3—3 indicated in the embodiment of FIG. 2.

Thus, embodiments of the present invention provide for an integrated antenna arrangement which allows for uncomplicated mounting of the antenna to a radio, and immediate installation of the integrated PCMCIA card and radio within the host computer. Referring to FIG. 2, preferred embodiments of the present invention include a patch-type antenna 12 which can be directly coupled to a GPS radio receiver 14. The receiver 14 is coupled to and extends from a PCMCIA memory interface card 16. When radio reception is desired, the antenna 12 may be mounted on, and thus supported by, the GPS receiver 14, as illustrated in FIGS. 2 and 3.

As shown in the figures, in preferred embodiments, the PC card 16 is an extended-form PCMCIA compliant Type II interface and is approximately half as thick as the GPS receiver 14. Depending upon the particular application and the type of slot 17 provided in the host computer 15, the PCMCIA card 16 may be thicker or thinner than that shown. Preferably, because it appears that the majority of today's computing devices having PCMCIA slots utilize the Type II standard size, embodiments of the PC card coupled to the GPS receiver, as described herein, comply with a Type II standard.

In preferred embodiments, the PC card 16 includes an application specific integrated circuit (ASIC), a universal asynchronous receiver transmitter (UART), and a read only memory (ROM). The ASIC, for example, performs logic functions necessary for particular applications to interface the PCMCIA standard with the host computer 15. Because the PC card and GPS receiver arrangement produces a serial output, the UART provides a means of converting the serial data to a digital parallel format across a PCMCIA bus (not shown). When configured according to the standard communications port addresses, the UART acts as a standard serial interface.

The antenna 12 is mounted to the radio receiver 14 via a two-part coaxial connector 18 and 20. Half of the coaxial connector 18, e.g., the male or female part, is defined on one surface of the antenna 12. The opposing part of the coaxial connector 20 is formed in an adjacent surface of the GPS receiver. When the two halves of the coaxial connector are mated, the facing surfaces of the antenna and the receiver directly abut each other such that the antenna and receive are electrically coupled without the use of coaxial cables. As a consequence, as signal attenuation and losses are reduced by eliminating unnecessary cables, the receiver performance is improved due to an increase in the carrier-to-noise ratio, and the system cost and complexity are reduced.

As illustrated in FIGS. 2 and 3, the male and female components 18 and 20 of the coaxial connector are affixed to the antenna 12 and GPS receiver 14, respectively. The female component 18 is mounted to the underside 24 of the antenna 12. In the illustrated embodiment of FIG. 3, the female component 18 protrudes from the lower surface 24 of the antenna 12 for coupling with the male component 20 formed in the upper surface 22 of the GPS receiver 14. Preferably, the male connector 20 is formed as an indent in the upper surface 22 of the receiver 14. In this way, the protruding female connector 18 can be quickly and simply inserted into the male connector 20 to provide a tight snap-fit in which little or no space is left between the surfaces 24 and 22 of the antenna 12 and the receiver 14, respectively. Such an arrangement allows minimal movement and shifting of the antenna relative to the GPS receiver and, consequently, substantially reduces the potential for breakage or loss of the received radio frequency (RF) signal. Moreover, the particular connector configuration provides a repeatable ground plane for the antenna.

In alternate embodiments, the arrangement of the male and female coaxial connector components may be reversed, such that the male component is attached to the antenna, while the female component is coupled to the GPS receiver. Similarly, it will be recognized that to produce a snug, snap-fit arrangement between the antenna 12 and the GPS receiver 14, either the male or female coaxial connector part may protrude from or be contained within its respective mounting surface. For example, the male connector may be mounted to the lower surface 24 of the antenna 12 and protrude therefrom for insertion into an associated female connector defined within the upper surface 22 of the GPS receiver 14.

In even further embodiments, it is contemplated that other connection arrangements, in addition to coaxial connectors, may be used. For example, depending upon the type and complexity of antenna used, the radio and antenna may be directly connected via single conductor cabling. In such instances, the radio and antenna may be connected directly by a single line connection scheme.

Other configurations which can provide for maintaining the preferred direct-facing configuration in which little or no clearance remains between the antenna surface 24 and the GPS receiver surface 22 are also contemplated. For example, the male and female coaxial connectors may both be arranged to protrude slightly from the lower and upper surfaces of the antenna and the GPS receiver 14, respectively. However, because in certain embodiments, the antenna 12 may be thinner than the GPS receiver 14, the connector component carried by the antenna 12 is preferably externally attached or otherwise protrudes from the lower surface 24 of the antenna 12. Such construction is preferred to avoid interference between the coaxial connector attachment and the antenna element disposed within the antenna 12.

As shown in FIG. 3, the antenna 12 is a patch-type antenna in which a metal material 13, such as copper, aluminum, or a composite substance, is bonded to opposite sides of a high-dielectric material (not shown) and encased within a radome structure 26. The dielectric material may comprise a ceramic or fiberglass substrate. The external surface of the metal material 13, which receives the RF signals, is etched to obtain the optimum receiving characteristics based on the dielectric constant of the materials used to form the substrate and the radome, the size of the patch element 13, and the received frequency. This arrangement helps to prevent resonant frequency drift with temperature variations. Consequently, the signal reception area may be maximized, while the antenna size and unnecessary protrusion are reduced.

As explained above, the coaxial connector components 18 and 20 are preferably mounted on the lower and upper surfaces of the antenna and GPS receiver, respectively. Accordingly, the female connector 18 is in contact with the internal conductive material of the antenna 12. The male connector 20, which is coupled to an RF interface (not shown) internal to the GPS receiver 14, can then be mated to the female connector 18 with the respective surfaces of the antenna 12 and the receiver 14 facing each other.

Supplemental fastening devices and interconnecting structures may be implemented to secure the antenna 12 to the receiver 14. For example, as shown in FIG. 2, multiple indentations 40 are provided about the periphery of the antenna 12 for slidable mating with associated receiving slots 42 formed along the sides of the receiver 14. The indentation/slot structures act as guides to provide an uncomplicated means of aligning and coupling the two connector halves 18 and 20 together. Furthermore, such alignment prevents mismatching of the connector halves and possible connector damage. Accordingly, a user can easily attach the antenna to the receiver.

Thus, by simply aligning the guide indentations 40 with the corresponding slots 42, and sliding the indentations 40 provided in the antenna through the slots 42 provided in the receiver 14, the antenna can be quickly mounted and secured to the receiver without requiring extra careful attention to accurately match together the coaxial connector halves 18 and 20. Although the configuration and structure of the indentation and slot arrangement are particularly described, it will be recognized, however, that a variety of guide or alignment configurations may be employed.

In other embodiments, for example, the antenna 12 may be mounted to the GPS receiver 14 by screws or other semi-permanent devices which supplement the snap-in connection provided by the coaxial connector. Screws generally will not detune the antenna as long as proper design criteria are followed. Such means of affixing the antenna to the GPS receiver or to another object is preferred if permanent or rigid antenna attachment is desired. In still further embodiments, different means such as an adhesive and the like may be used to secure the antenna to the GPS receiver.

Although the upper exposed surface of the radome 26 comprises a curved shape, with the underside being relatively flat to conform to the shape of the GPS receiver 14, it will be recognized that other antenna shapes, configurations, and arrangements may be implemented. For example, the antenna may be completely flat to minimize wind resistance, e.g., for use in or on a moving vehicle, or malleable to fit around or within limited, defined spaces.

Figure 4:
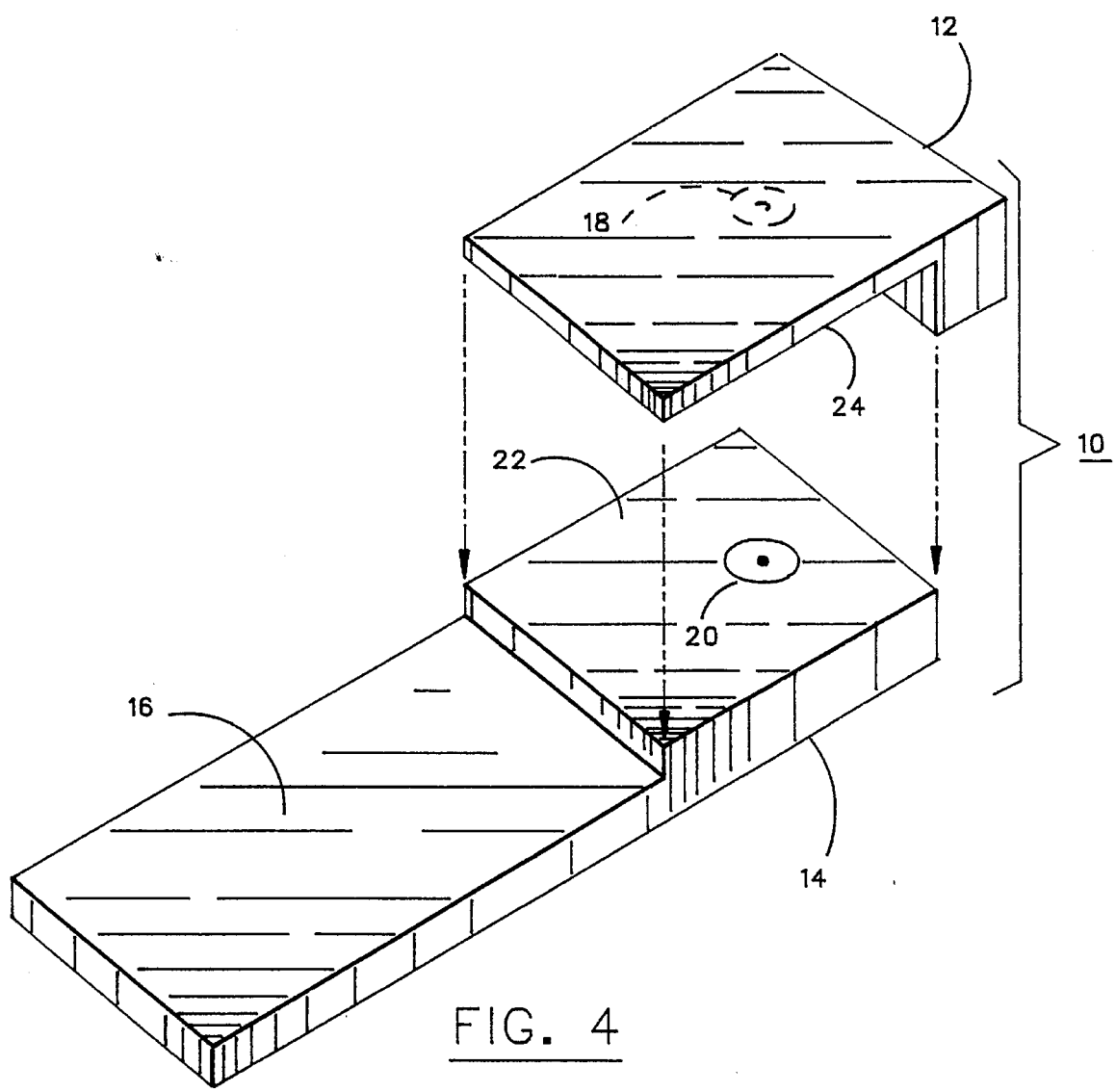
FIG. 4 is a perspective view of an alternate embodiment of the present invention.

Depending upon the particular application, the antenna may have a variety of shapes or configurations to accommodate the receiver structure and mounting arrangement. For example, referring to FIG. 4, the antenna 12 has an L-shape which conforms to one of the upper edges of the receiver 14. The male and female coaxial connector components may be coupled to either the underside 24 of the antenna 12 and the upper surface 22 of the receiver 14. The numerical references to the various elements of FIG. 4 are coincident with those of FIGS. 2 and 3 to indicate that, preferably, the shape of the antenna structure 12 should not affect the direct coupling arrangement of the antenna to the receiver.

Irrespective of the shape and arrangement of the antenna and GPS receiver, however, in preferred embodiments of the present invention, the patch antenna is tuned to match the net impedance of the antenna elements, including the dielectric material, ground plane and receiver input impedance to maximize the signal received by the GPS receiver 14. Preferably, a constant impedance value is matched between the antenna and the GPS receiver. By eliminating a changing or undesirably varying impedance, reflection losses are also eliminated. Consequently, the voltage standing wave ratio is approximately equal to one, thereby providing better system performance under adverse conditions.

While the illustrated embodiment employs a GPS receiver which is thicker than the standard Type II PCMCIA interface card, it will be recognized that further embodiments may employ a substantially thinner or smaller GPS receiver, such that the entire unit can be inserted into the Type II slot. In still further embodiments, the memory card and GPS receiver may be permanently hard-wired into the host computer. The patch antenna may then be directly connected to the receiver components carried within the host computer.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. An apparatus for implementation with a computer having a data interface slot, the apparatus for determining a user's position coordinates according to GPS satellite tracking data, comprising:

an antenna comprising a substantially flat conductive element for receiving the GPS satellite tracking data;

a GPS receiver for converting the GPS satellite tracking data into digital data, wherein the substantially flat conductive element is mechanically coupled to the GPS receiver, such that the substantially flat conductive element lies directly over the GPS receiver during operation while receiving the GPS satellite tracking data; and a data interface card (PC card) having a first end and a second end, wherein
the first end is adapted for insertion into the computer data interface slot,
the GPS receiver and the antenna having the substantially flat conductive element mechanically coupled thereto are affixed to the second end, and
the PC card includes a serial data interface bus for conducting the digital data from the GPS receiver to the first end of the card.

2. The apparatus of claim 1, wherein the GPS receiver is integral with the PC card.

3. The apparatus of claim 1, wherein the data interface slot is a PCMCIA Type II slot and the PC card has a Type II thickness such that when the PC card is inserted into the data interface slot, the GPS receiver, mounted to the PC card, is adjacent and external to the computer.

4. The apparatus of claim 1, wherein the data interface slot is a PCMCIA Type III slot and the PC card has a Type II thickness such that when the PC card is inserted into the data interface slot, the GPS receiver, mounted to the PC card, fits within the data interface slot.

5. An apparatus for receiving radio communication signals, comprising;

a radio having a top surface defining a surface area for insertion into a computer;

a removable substantially flat antenna having top and bottom surfaces, the top and bottom surfaces having substantially equivalent surface areas, wherein the antenna includes a metal conductive element coupled to a high-dielectric material; and a connector having a first part and a second part, the first part being affixed directly to the metal conductive element within the substantially flat antenna, through the bottom surface of the substantially flat antenna and the second pan being affixed to the top surface of the radio, such that when the first and second parts are coupled together during operation, the antenna lies directly facing the radio wherein a substantial mount of the surface area of the bottom surface of the substantially flat antenna is directly adjacent a substantial amount of the surface area of the top surface of the radio to enable elimination of cabling between the antenna and the radio.

6. The apparatus of claim 5, further comprising:

a computer having a data interface slot, and a digital interface card (PC card) for digitally coupling the radio to the computer, wherein the radio is mounted to the PC card which is slidably insertable into the data interface slot such that the radio communication signals received by the antenna and radio assembly are digitized and processed by the PC card and the computer.

7. The apparatus of claim 6, wherein when the PC card and receiver assembly are inserted into the data interface slot within the computer, the top surface of the antenna is exposed externally from the computer and the radio to receive the radio communications signals.

8. The apparatus of claim 5, wherein the size and shape of the bottom surface of the substantially flat antenna conform to and are compatible with the size and shape of the top surface of the radio.

9. The apparatus of claim 5, further comprising a plurality of elongated slots formed about the outer periphery of the radio, and an associated plurality of elongated protrusions provided about the inner periphery of the antenna, wherein the slots and associated protrusions are configured for slidable mating with each other such that the radio and antenna can be easily aligned and coupled together.

10. The apparatus of claim 5, wherein the second part of the connector is disposed within an indent in the top surface of the radio, and the first part of the connector protrudes from the bottom surface of the antenna.

11. The apparatus of claim 5, wherein the radio has a substantially flat, rectangular shape, and the substantially flat antenna has an L-shaped longitudinal cross-section which conforms to the shape of the radio.

12. The apparatus of claim 5, wherein the connector comprises a coaxial connector.

13. A radio frequency signal tracking system for improving RF signal reception and reducing coaxial cable losses, the system comprising;

a global positioning system (GPS) radio receiver;

a patch antenna coupled to the GPS receiver for receiving satellite signals, the patch antenna including a high dielectric material coupled to a substantially flat electrically conductive material;

a Personal Computer Memory Card International Association (PCMCIA) interface card (PC card) mounted to and extending from the GPS receiver;

a host computer for driving the functions of the GPS receiver and the PC card, the host card having a PCMCIA compliant interface slot for slidably receiving the PC card; and a coaxial connector coupled to the GPS receiver and the electrically conductive material within the patch antenna for directly connecting the GPS receiver to the electrically conductive material without additional cabling, thereby minimizing cable losses and RF signal attenuation, wherein the coaxial connector includes a female part and a male part, either of the female and male parts being affixed to the GPS receiver and the electrically conductive material within the patch antenna, further wherein the GPS receiver and the patch antenna having the electrically conductive material therein have substantially flat connector surfaces to which are attached the male and female parts of the coaxial connector, such that when the female and male parts are connected together, the substantially flat connector surface of the patch antenna is directly adjacent to and faces the substantially flat connector surface of the GPS receiver.

14. The system of claim 13, wherein the patch antenna has a surface area which is substantially equal to that of the GPS receiver.

15. The system of claim 13, wherein the high dielectric material comprises a ceramic material.

16. A method for improving radio frequency signal reception and quality by a GPS receiver and antenna arrangement, the GPS receiver and the antenna having substantially flat connector surfaces, the method comprising the steps of:

attaching a first half of a coaxial connector to the connector surface of the antenna, the coaxial connector being directly connected such that no cabling is used;

attaching a second half of the coaxial connector to the connector surface of the GPS receiver;

mating the two halves of the coaxial connector together such that during operation the antenna is directly connected to the GPS receiver, and the substantially flat connector surfaces of the GPS receiver and the antenna lie immediately adjacent and directly face each other;

inserting the GPS receiver and antenna arrangement into a computer; and receiving RF signals with substantially improved signal reception and reduced cable losses.

17. The method of claim 16, wherein the location, speed, and time coordinates of the user are produced, the method further comprising the steps of:

coupling a Personal Computer Memory Card International Association (PCMCIA) interface card (PC card) to the GPS receiver;

inserting the PC card into a slot provided in a host computer;

processing the RF signals received by the GPS receiver via the PC card and the host computer to determine the location, speed and time coordinates of the user; and time coordinates of the user; and displaying the location, speed and time coordinates to the user.

* * * * *